(12) United States Patent
Ma

(10) Patent No.: US 12,447,455 B2
(45) Date of Patent: Oct. 21, 2025

(54) REACTION APPARATUS AND PROCESSING METHOD THEREOF, AND PREPARATION DEVICE OF MICROSPHERES FOR EMBOLIZATION AND PREPARATION METHOD THEREOF

(71) Applicant: Suzhou Hengrui Hongyuan Medical Technology Co., Ltd., Suzhou (CN)

(72) Inventor: Yadan Ma, Suzhou (CN)

( * ) Notice: Subject to any disclaimer, the term of this patent is extended or adjusted under 35 U.S.C. 154(b) by 631 days.

(21) Appl. No.: 17/639,550

(22) PCT Filed: Sep. 21, 2020

(86) PCT No.: PCT/CN2020/116485
§ 371 (c)(1),
(2) Date: Mar. 1, 2022

(87) PCT Pub. No.: WO2021/147356
PCT Pub. Date: Jul. 29, 2021

(65) Prior Publication Data
US 2022/0331769 A1 Oct. 20, 2022

(30) Foreign Application Priority Data

Jan. 21, 2020 (CN) .......................... 202010072301.0
Jul. 24, 2020 (CN) .......................... 202010722636.2

(51) Int. Cl.
*B01J 13/02* (2006.01)
*B01J 4/00* (2006.01)
(Continued)

(52) U.S. Cl.
CPC .............. *B01J 13/02* (2013.01); *B01J 4/001* (2013.01); *B01J 19/0013* (2013.01); *B01J 19/02* (2013.01)

(58) Field of Classification Search
None
See application file for complete search history.

(56) References Cited

U.S. PATENT DOCUMENTS 10,487,183 B2  11/2019  Takemoto et al.
10,632,442 B2  4/2020  Kim
(Continued)

FOREIGN PATENT DOCUMENTS

CN  101507909 A  8/2009
CN  102898579 A  1/2013
(Continued)

OTHER PUBLICATIONS

CN 102898579 English trans (Year: 2012).*
(Continued)

*Primary Examiner* — Jeffrey D Washville
(74) *Attorney, Agent, or Firm* — CAIP; Xia Li

(57) ABSTRACT

The present invention provides a reaction apparatus and a processing method thereof, wherein the reaction apparatus includes a main body structure layer and an encapsulation layer, the main body structure layer is integrated with a tube for liquid beads, and the encapsulation layer is stacked at one side of the main body structure layer; the main body structure layer and the encapsulation layer are made from the same material, a melting temperature of the main body structure layer is higher than a melting temperature of the encapsulation layer, and the main body structure layer is connected to the encapsulation layer by way of thermal bonding. The above reaction apparatus has advantages such as integration, structural stability and high strength, as well as significantly improving the stability in generating liquid beads. The present invention further relates to a preparation device of microspheres for embolization and a preparation method thereof. The device is provided by combining three major systems of a feed system, a microsphere generation
(Continued)

S1 — Processing the main body structure layer and the encapsulation layer respectively by using the same material, and controlling a degree of polymerization of the material so that a melting temperature of the encapsulation layer obtained by processing is lower than a melting temperature of the main body structure layer obtained by processing S2 — Connecting the main body structure layer obtained by processing to the encapsulation layer obtained by processing by way of thermal bonding module and a curing apparatus with a providing device. The device realizes automatic, standardized and controlled production, and significantly improves the production efficiency of the microspheres for embolization, while reaching a purpose of accurately controlling the size of the microspheres for embolization to achieve homogeneity of the particle size of the product, thereby being of great significance in the fields of biomedicine, medical equipment and the like.

8 Claims, 5 Drawing Sheets

(51) Int. Cl.
*B01J 19/00* (2006.01)
*B01J 19/02* (2006.01)

(56) References Cited

U.S. PATENT DOCUMENTS

| | | | |
|---|---|---|---|
| 2005/0221339 A1* | 10/2005 | Griffiths | B01F 33/3031 435/7.1 |
| 2018/0105808 A1* | 4/2018 | Mikkelsen | C12Q 1/6804 |
| 2019/0345636 A1 | 11/2019 | McDermott et al. | |

FOREIGN PATENT DOCUMENTS

| | | | |
|---|---|---|---|
| CN | 103191021 | A | 7/2013 |
| CN | 107008517 | A | 8/2017 |
| CN | 107376796 | A | 11/2017 |
| CN | 109793916 | A | 5/2019 |
| EP | 0162659 | A2 * | 11/1985 |
| WO | 2006074665 | A | 6/2007 |
| WO | 2012025224 | A | 3/2012 |

OTHER PUBLICATIONS

International Search Report, issued in PCT/CN2020/116485, dated Dec. 21, 2020.
Written Opinion, issued in PCT/CN2020/116485, dated Dec. 21, 2020.
Preparation of Cyclic Olefin Polymer (COP) Microfluidic Chips and Performance Comparison with Polymethyl Methacrylate (PMMA) Microfluidic Chips. Oct. 31, 2007 Chinese High Technology Letters.
CN202010722636.2—search report.
CN202010072301.0—search report.
Han Xianwei Preparation of polyvinyl alcohol microspheres based on microfluidic droplet formation technology Analytical Chemistry, vol. 46, Issue 8 2018.
2020800935652—Search Report.

* cited by examiner

| S1 | Processing the main body structure layer and the encapsulation layer respectively by using the same material, and controlling a degree of polymerization of the material so that a melting temperature of the encapsulation layer obtained by processing is lower than a melting temperature of the main body structure layer obtained by processing |

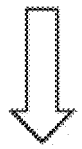

| S2 | Connecting the main body structure layer obtained by processing to the encapsulation layer obtained by processing by way of thermal bonding |

Fig. 1

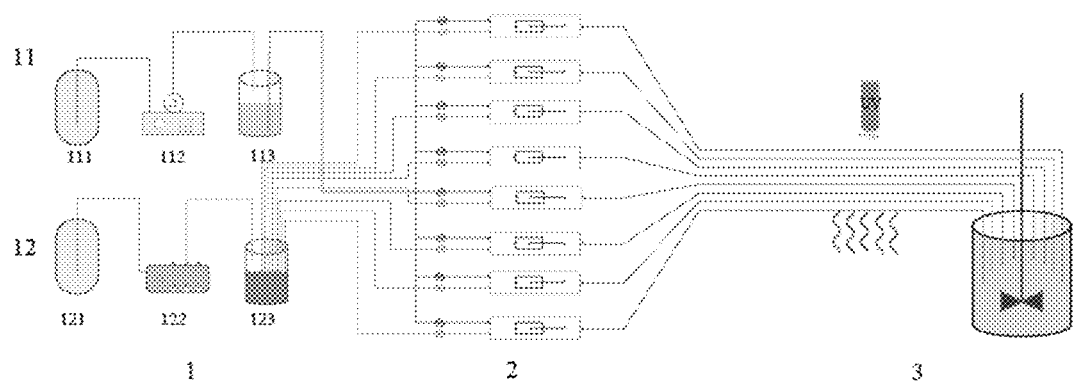

Fig. 2

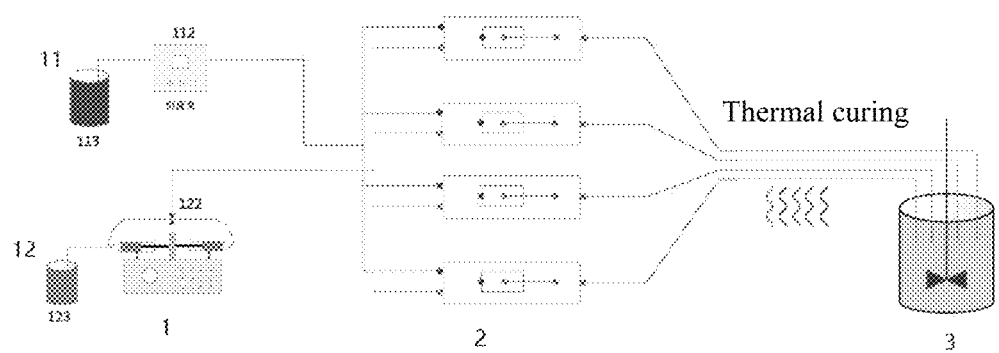

Fig. 3

REACTION APPARATUS AND PROCESSING METHOD THEREOF, AND PREPARATION DEVICE OF MICROSPHERES FOR EMBOLIZATION AND PREPARATION METHOD THEREOF

BACKGROUND OF THE INVENTION

Field of the Invention

The present invention relates to the technical field of production of medical instruments, in particular, to a reaction apparatus for producing microspheres for embolization and a processing method thereof, a preparation device of microspheres for embolization and a preparation method of microspheres for embolization.

Description of the Prior Art

Tumor cancer has become a top threat to global public health. In our country, about 4 million new cancer patients are added each year, and 600000 to 700000 people are undergoing tumor intervention therapy, which increases at a rate of 10-20%. With the development of minimally invasive technology, a chemotherapy and embolotherapy with drug-eluting microspheres for embolization is emerging as a new embolotherapy technology, which can not only be loaded with chemotherapy drugs, but also can function as embolism, thereby realizing continuous treatment for the tumor and improving therapeutic efficacy.

The method of treating tumor diseases with polyvinyl alcohol microspheres for embolization has been a very important clinical treatment method, which has principles of clogging blood vessels at the site by microspheres and cutting off the nutritional supply of tumor cells to cause tumor cells to shrink due to being lack of nutrition; at the same time, the microspheres for embolization can be carried with chemotherapy drugs, and continues to slowly release the drugs at the blood vessels near the tumor for targeted treatment of the tumor, thereby achieving therapeutic efficacy.

At present, in the listed embolism materials, products with loaded chemotherapy drugs are only DC Bead® of Biocompatibles Corporation from U.K., Hepasphere® of BioSphere Corporation from U.S.A., and CalliSpheres® from Jiangsu Hengrui Pharmaceuticals Co., Ltd. The above three hepaSphere microsphere products have greatly improved the defects of traditional embolism materials, and have achieved breakthrough therapeutic results in the course of clinical treatment of liver cancer and other tumors.

At present, the particle size of the polyethylene alcohol microspheres for embolization products is not homogeneous, but is within a certain range, such as 100-300 μm, 300-500 μm, 500-700 μm. Studies have shown that the tumor is surrounded by blood vessels of all sizes, wherein the closer to the center of the tumor, the finer the blood vessels (i.e. blood vessels smaller than 100 um), the better the embolism effects. Therefore, the microspheres with smaller and more homogeneous particle size allowing them to enter and move closer to the blood vessels of the tumor during clinical embolism. And in terms of production processes, at present, the microspheres are prepared using "one-pot reaction", and then the microsphere products with a targeted range of the particle size are obtained through the screening processes. The production process has problems such as low efficiency, complex quality control, high labor intensity and high cost. Therefore, there is a need for developing new polyethylene alcohol microspheres for embolization with homogeneous particle size and a production process thereof, so as to improve productivity and obtained precision treatment results.

At present, there are literature and patent reports on the preparation of microspheres with a homogeneous particle size. For example, the patent CN 107418872 A disclosed a preparation method of preparing bio-ink microspheres using a focusing, T-shaped droplet-based microfluidic chip, which includes: a droplet generation module, including a first fluid inlet, a droplet microfluidic chip and an output port, wherein the droplet microfluidic chip includes a runner system, the first fluid inlet and the output port are communicated with the runner system respectively, and a dispersed phase fluid entering the runner system from the first fluid inlet forms droplets and the droplets are output from the output port; a collection processing module, including a collection processing body, wherein the collection processing body includes a plurality of collection holes each having an acting surface, the acting surfaces of the collection holes are separated from each other, and the collection holes are used to receive the droplets to the action surfaces and form microspheres based on the droplets on the acting surfaces; a motion module, in driving connection with the output port and/or the collection processing body so that each of the droplets drops to the acting surfaces of the collection holes correspondingly; a control module, coupled to the droplet generation module and the motion module respectively. The device is mainly used to prepare the bio-ink microspheres with biological activities. The microsphere is a layered spherical structure set radially along the microsphere, with a particle size of 5-120 μm, wherein the key is to control the number of cells contained in the collagen solution containing cells in the core fluid.

The key of the above technical solution is the design in the structure of the droplet generation module including the microfluidic chip for bio-ink, and corresponding design of the collection processing module, the motion module and the control module.

However, the above apparatus cannot be directly applied in the preparation of the polyethylene alcohol microspheres for embolization, and the particle size of 5-120 μm cannot meet the requirement in the diameter of polyethylene alcohol microspheres for embolization.

The patent CN101376093A used a co-axial assembled by tetrafluoro capillaries and hollow fibers, which can prepare single-dispersed polymer microspheres; the patent is disclosed in 2009, and the technology is relatively backward, which provides the technical idea for the following microreactor, but there are no good supporting technologies to prepare the polyethylene microspheres for embolization meeting requirements in today's surgery.

The patent CN109793916A used a micro-channel pipeline to prepare the polyethylene alcohol microspheres for embolization with a homogeneous particle size; the patent provided a process of preparing the polyethylene alcohol microspheres for embolization using a micro-channel pipeline, but the application does not disclose the corresponding process equipment and still has shortcomings in the application of industrialization.

The above patents prepare homogeneous microspheres with different particle sizes by regulating the flow rate of two phases and the droplet generation structure through mutual shearing of the dispersed phase and the continuous phase with the microfluidic technology.

The above microfluidic technology solution is still mainly in the stage of scientific research; using single pipeline or single chip to prepare the microspheres with a homogeneous particle size is difficult in extending the process. At present, there is still no microfluidic production process to prepare large numbers of microspheres, with a lack of related equipment for stable, efficient, high-throughput microsphere preparation; there are problems of being no clear adaptability to the material used to prepare the microspheres, repeatability in production of chips, large errors in the homogeneity of particle size, uncontrollable formation of microspheres, and low efficiency, especially of being difficult to meet the requirements in batch and standardized production of the polyethylene alcohol microspheres for embolization required for medication.

In addition, the reaction apparatuses in the existing preparation devices of microspheres for embolization further have the following problems:

the reaction apparatuses are mostly manufactured by thermoplastic polymer, and are connected and assembled by bonding technology; however, for the processing and bonding technology of the thermoplastic polymer reaction apparatus, there are major problems in aspects such as processing efficiency, processing quality, processing precision and adaptability of the method, which are also main bottleneck problem for mass production of reaction apparatuses, with technical difficulty mainly manifesting in problems such as simultaneous requirement in solving problems in connection and sealing for the bonding, overall mechanical strength of the material of the reaction apparatus, collapse and deformation of the tubes, and consistency of mass production. Therefore, there is an urgent need for developing a reaction apparatus that can achieve mass production.

SUMMARY OF THE INVENTION

In view of the problems in the background, the present invention provides a reaction apparatus, which includes a main body structure layer and an encapsulation layer, the main body structure layer being integrated with a tube for liquid beads, the encapsulation layer being stacked at the side of the main body structure layer;

wherein a melting temperature of the main body structure layer is higher than a melting temperature of the encapsulation layer, and the main body structure layer is connected to the encapsulation layer by way of thermal bonding.

In some embodiments, the main body structure layer and the encapsulation layer are made from the same material.

In some embodiments, the tube integrated in the main body structure layer is provided with a dispersed phase feed inlet, a continuous phase feed inlet and a discharge outlet; the tube is a flow-focusing tube or a co-axial tube or a T-shaped tube or a Y-shaped tube.

In some embodiments, the flow-focusing tube includes a main tube, a dispersed phase tube and two continuous phase tubes, the two continuous phase tubes are arranged symmetrically, and the dispersed phase tube is arranged between the two continuous phase tubes; both ends on the same sides of the two continuous phase tubes and the dispersed phase tube are connected to and communicated with one end of the main tube, and the other end of the main tube extends to the end away from the dispersed tube and the continuous phase tubes.

In some embodiments, a diameter ratio of the continuous phase tube to the dispersed phase tube to the main tube is 1:(0.2-1:1)-1.5.

In some embodiments, the end of the continuous phase tube away from the main tube is provided with the continuous phase feed inlet, the end of the dispersed phase tube away from the main tube is provided with the dispersed phase feed inlet, and the end of the main tube away from the dispersed phase tube and the continuous phase tube is provided with the discharge outlet.

In some embodiments, the continuous phase feed inlet, the dispersed phase feed inlet and the discharge outlet penetrates through the main body structure layer, and ends of the continuous phase feed inlet, the dispersed phase feed inlet and the discharge outlet are sealed by the encapsulation layer.

In some embodiments, the ends of the two continuous phase tubes away from the main tube are communicated with each other and share one continuous phase feed inlet.

In some embodiments, a diameter ratio of the dispersed phase tube feed inlet to the dispersed phase tube is 1:(1-2); a diameter ratio of the continuous phase tube feed inlet to the continuous phase tube is 1:(1-2).

In some embodiments, the dispersed phase feed inlet is communicated with the dispersed phase tube through a connecting tube, and a diameter of the connecting tube is greater than a diameter of the dispersed phase tube.

In some embodiments, a position where the connecting tube is connected to the dispersed phase tube is shaped as a slope, and an inclination angle of the slope ranges from 30° to 60°.

In some embodiments, the discharge outlet has an inner hole diameter larger than an outer hole diameter.

In some embodiments, the discharge outlet is a step-shaped hole or a horn-shaped hole.

In some embodiments, the reaction apparatus further includes a support layer, wherein the support layer is stacked at the side of the encapsulation layer opposite to the main body structure layer.

In some embodiments, a material thickness ratio of the main body structure layer to the encapsulation layer to the support layer is 1:(0.05-0.5):(1-3).

In some embodiments, the support layer, the main body structure layer, and the encapsulation layer are made from the same material In some embodiments, the main body structure layer and the encapsulation layer are made from a thermoplastic polymeric material.

In some embodiments, the main body structure layer and the encapsulation layer are made from a cyclo olefin polymer.

The present invention further provides a processing method of a reaction apparatus, which is used to process the reaction apparatus mentioned above, the processing method including:

S1, processing the main body structure layer and the encapsulation layer respectively by using the same material, and controlling a degree of polymerization of the material, wherein a melting temperature of the encapsulation layer obtained by processing is lower than a melting temperature of the main body structure layer obtained by processing; and S2, connecting the main body structure layer obtained by processing to the encapsulation layer obtained by processing by way of thermal bonding.

Preferably, the step S2 further includes connecting the main body structure layer to the encapsulation layer by way of thermal bonding under a vacuum condition.

In some embodiments, the step S2 further includes enabling a thermal bonding temperature to be lower than the melting temperature of the main body structure layer and to be higher than or equal to the melting temperature of the encapsulation layer.

In some embodiments, the thermal bonding temperature differs by 0.1-10% from the melting temperature of the main body structure layer.

In some embodiments, the step S2 further includes enabling the thermal bonding temperature to be within a range of 90–160° C.

In some embodiments, the step S2 further includes enabling a thermal bonding time to be within a range of 3-30 min.

In some embodiments, the step S2 further includes enabling a thermal bonding pressure to be within a range of 20-200 kg.

In some embodiments, the method further includes a step S3 of connecting a support layer on the side of the encapsulation layer opposite to the body layer by way of glued connection.

In some embodiments, the step S3 further includes enabling an adhesive pressure between the support layer and the encapsulation layer to be within a range of 1-10 kg.

In some embodiments, the step S3 further includes enabling an adhesive time between the support layer and the encapsulation layer to be within a range of 3-30 s.

The reaction apparatus provided by the present invention, wherein the main body structure layer and the encapsulation layer are made from the same material, improves on the one hand the overall mechanical strength of the reaction apparatus, and on the other hand provides theoretical support for the thermal bonding connection between the two layers, as well as avoiding the introduction of impurities. The present invention further defines that the melting temperature of the main body structure layer is higher than that of the encapsulation layer, and the function of connection may be realized only when the thermal bonding temperature reaches the melting temperature of the encapsulation layer during the process of the thermal bonding connection while the thermal bonding temperature may also be realized to be lower than the melting temperature of the main body structure layer, so that the problems of collapse and deformation of the tubes for the inner formation grooves caused by the high thermal bonding temperature during the process of the thermal bonding connection may be prevented, thereby facilitating consistency of mass production and adaptability in mass production.

The reaction apparatus provided by the present invention has advantages such as integration, structural stability and high strength, as well as significantly improving the stability in generating liquid beads. Meanwhile the reaction apparatus has the advantages of high efficiency in making, good quality and adaptability in mass production, and is of great significance for the application of the reaction apparatus in the fields such as clinical diagnosis, drug analysis, environmental monitoring and food development.

The present invention provides a preparation device of microspheres for embolization, which includes a feed system, a microspheres generation module and a curing apparatus, the feed system being connected to the microspheres generation module, the microspheres generation module being connected to the curing apparatus, wherein the microspheres generation module comprises at least one micro-reactor, and the micro-reactor adopts the reaction apparatus mentioned above.

In some embodiments, the microspheres generation module includes a plurality of the micro-reactors connected in parallel, the plurality of micro-reactors are connected to the feed system and the curing apparatus respectively, and the plurality of micro-reactors are used for generating the microspheres with the same diameter or different diameters.

In some embodiments, the feed system includes a continuous phase feed system and a dispersed phase feed system, and the continuous phase feed system and the dispersed phase feed system are communicated with the continuous phase feed inlet and the dispersed phase feed inlet of each of the micro-reactors respectively.

In some embodiments, the continuous phase feed system includes a continuous phase feed pump and a continuous phase storage tube that are connected with each other, and the continuous phase storage tube is communicated with the continuous phase feed inlet of each of the micro-reactors; and the dispersed phase feed system includes a dispersed phase feed pump and a dispersed phase storage tube that are connected with each other, and the dispersed phase storage tube is communicated with the dispersed phase feed inlet of each of the micro-reactors.

In some embodiments, the continuous phase feed system further includes a first pressure source apparatus, and the first pressure source apparatus, the continuous phase feed pump and the continuous phase storage tube are connected with each other in sequence;

the dispersed phase feed system further includes a second pressure source apparatus, and the second pressure source apparatus, the dispersed phase feed pump and the dispersed phase storage tube are connected with each other in sequence.

In some embodiments, the continuous phase feed pump and the dispersed phase feed pump adopt a pump equipped with flow and pressure control apparatuses.

In some embodiments, each of the micro-reactors further includes a microfluidic chip, and the microfluidic chip cooperates with a controller to control a flow rate of a reaction fluid flowing into the micro-reactor.

In some embodiments, the curing apparatus is an ultraviolet curing apparatus or a thermal curing apparatus, both of which include curing containers and corresponding generation apparatuses.

The present invention further provides a preparation method of microspheres for embolization, which is performed by the above-mentioned device, the method specifically includes steps of:

(1) the dispersed phase is mainly a water-soluble material, and components of the dispersed phase material are a polyvinyl alcohol and derivatives thereof, water, a crosslinking agent and a water phase material initiator; first, solving the initiator in the water, then adding the crosslinking agent in sequence, finally adding the polyvinyl alcohol and derivatives thereof, and then stirring uniformly to be the dispersed phase for future use;

the polyvinyl alcohol and derivatives thereof, with polyvinyl alcohol as a substrate and amino/hydroxyl derivatives of pyridine/sulfonate that may be cross-linked after acylation as a modifier, are modified to prepare cross-linkable small molecular polymers containing structures of acrylic acid and derivatives thereof;

the crosslinking agent in the dispersed phase material is an acrylic salt, which specifically includes sodium acrylic, ammonium salts of acrylamide acrylic acid, 2-Acrylamide-2-methylpropanesulfonic acid sodium, etc.;

the initiator may be divided into a peroxygenic initiator and a photoinitiator, wherein the peroxygenic initiator includes potassium persulfate, ammonium persulfate and the like, and the photoinitiator includes benzils or acylphosphine oxides;

a mass ratio of the polyvinyl alcohol and derivatives thereof to the water to the crosslinking agent to the water phase material initiator is 10:1-100:1-10:0.01-0.6;

(2) the continuous phase is mainly an oil-soluble material, which has components of organic solvents such as an oil phase initiator, a surfactant and n-Butyl acetate; mainly adding the oil phase material initiator and the surfactant into an ester solvent in sequence, and stirring uniformly to be the continuous phase for further use;

the initiator in the oil phase material is a tertiary amine compound, which includes tetramethylethylenediamine, triethanolamine, N,N-trimethylaniline and the like;

the surfactant is a alkane compound and a aromatic compound, which include alkyl benzene sodium sulfonate, cellulose acetate, sorbitant aliphatate and the like;

the oil phase material initiator and the surfactant account for 0.1%-5% of the n-Butyl acetate by mass.

(3) the dispersed phase material and the continuous phase material rely on a material feed system for transporting the materials, and a suitable precision pump may be selected as a drive apparatus depending on the nature of the fluid and the amount of feed so that the material is transported to the microsphere generation module stably and continuously with high throughput;

the drive apparatus is a precision pump, which includes a high precision injection pump, a high precision constant flow pump and a precision pressure pump, with apparatuses such as a computer control panel and a sensor feedback;

for the material flow rate, by the precision pump, the dispersed phase flow rate is controlled at 0.1-500 µL/min and the continuous phase flow rate is controlled at 100-50000 µL/min;

(4) the microsphere generation module adopts microreactor apparatuses such as a chip type and a microtubular type, and the dispersed phase is formed into single dispersed microspheres under the shear force of the continuous phase by regulating the structure, material, running parameters and the like of the microfluidic chip after the material is transported to the microreactor apparatus, so that the microspheres with a homogeneous particle size are prepared, with an adjustable particle size of the microsphere of 20-1400 um and a homogeneity of particle sizes of less than 10%;

the structures of the chip type and the micro-tubular type micro-reactors are a flow-focusing type or a co-axial type or a T-shaped type or a Y-shaped tube type structure, with a pipeline inner diameter of 20-2000 µm;

the micro-reactor is preferably made from high polymeric materials such as COP, COC, PTFE and ABS, with excellent properties such as corrosion resistance, ultrahydrophobic, high transparency;

the preparation method of the micro-reactor adopts processes such as 3D printing, CNS and injection molding, with advantages of mass production, high reproducibility and low price, providing assurance for high-throughout production of the microspheres with a homogeneous particle size;

(5) the microspheres with a homogeneous particle size are transported to the curing apparatus after being generated, the internal cross-linkage of the microspheres is performed, and the collection and post-processing processes of the microspheres are completed. Both two kinds of curing methods may quickly cross-link the polymeric microspheres to improve the stability of the product. Meanwhile, more selectivities are provided for the materials for preparing the microspheres, the cross-linking way and speed of the microspheres are increased effectively, and further simplicity and selectivity for the production process of the polyethylene alcohol microspheres for embolization are improved.

The curing apparatus may select two modes of thermal curing and light curing, wherein according to the nature of the initiator in the polyethylene alcohol material, if the initiator is a chemical initiator, then the thermal curing apparatus is selected, and if the initiator is the photoinitiator, then the light curing apparatus is selected;

the thermal curing apparatus adopts a sandwiched reaction flask apparatus to preserve heat by a circulating temperature control apparatus, with a curing temperature of 40-80° C. and a curing time of 1-6 h, thereby reaching the double effects of enriching and pre-curing while reaching homogeneity of the product by controlling the reacting time with the discharge rate;

the light curing apparatus adopts a coil apparatus with a pipeline having advantages of high transparency and high light absorption rate to flow the prepared microspheres in a pipeline continuously and use a high-intensity ultraviolet lamp for real-time light curing, with an irradiation wavelength of 200-500 nm and an irradiation time of 2-1000 s, so that the polymeric microspheres are cured fully to realize quick, high-efficient and safe preparation of the microspheres for embolization with a homogeneous particle size.

Further, the present invention control the device with a PLC controller or a control cabinet in the prior art; the controller or the control cabinet controls a flow electronic pump/feed pump in the feed system, controls a continuous phase/dispersed phase pressure container that possibly exists, and controls a temperature and a pressure in the microsphere generation module and the curing apparatus.

In the above control system, the microsphere generation module includes a plurality of micro-reactors connected in parallel, and the control system includes fault tolerance settings; when one of the micro-reactors fails, the control system may automatically cut off the line where the micro-reactor is located without affecting other lines and the reaction flow in the latter sequence.

The micro-reactor in the microsphere generation module selects the material and formation way according to the reaction requirements, and selects different inner diameters of the pipeline, to control the flow rate through the chip for the preparation of the microspheres with a homogeneous particle size.

Further, during the process of the reaction, the particle size of the polyethylene alcohol microspheres for embolization is controlled by controlling the inner diameter of the inlet of the microsphere generation module corresponding to the dispersed phase and the continuous phase and controlling a flow rate ratio of the dispersed phase to the continuous phase.

When the inner diameter of the dispersed phase tube is 20±10 µm and the inner diameter of the continuous phase tube is 20±10 µm, the feeding flow rate of the dispersed phase material is controlled at 0.1-2 µL/min, the feed flow rate of the continuous phase material is controlled at 400±200 μL/min and the particle size of the polyvinyl alcohol microspheres for embolization prepared is 20±10 μm, preferably is 2±5 μm.

When the inner diameter of the dispersed phase tube is 60±10 μm and the inner diameter of the continuous phase tube is 90±50 μm, the feeding flow rate of the dispersed phase material is controlled at 2±1 μL/min, the feed flow rate of the continuous phase material is controlled at 200±100 μL/min and the particle size of the polyvinyl alcohol microspheres for embolization prepared is 40±20 μm, preferably is 40±10 μm.

When the inner diameter of the dispersed phase tube is 100±20 μm and the inner diameter of the continuous phase tube is 300±150 μm, the feeding flow rate of the dispersed phase material is controlled at 5±2 μL/min, the feed flow rate of the continuous phase material is controlled at 800±300 μL/min and the particle size of the polyvinyl alcohol microspheres for embolization prepared is 100±25 μm, preferably is 100±10 μm.

When the inner diameter of the dispersed phase tube is 100±20 μm and the inner diameter of the continuous phase tube is 300±150 μm, the feeding flow rate of the dispersed phase material is controlled at 5±2 μL/min, the feed flow rate of the continuous phase material is controlled at 500±200 μL/min and the particle size of the polyvinyl alcohol microspheres for embolization prepared is 250±50 μm, preferably is 250±20 μm.

When the inner diameter of the dispersed phase tube is 250±130 μm and the inner diameter of the continuous phase tube is 500±200 μm, the feeding flow rate of the dispersed phase material is controlled at 20±5 μL/min, the feed flow rate of the continuous phase material is controlled at 2000±500 μL/min and the particle size of the polyvinyl alcohol microspheres for embolization prepared is 500±50 μm, preferably is 500±20 μm.

When the inner diameter of the dispersed phase tube is 800±300 μm and the inner diameter of the continuous phase tube is 1000±500 μm, the feeding flow rate of the dispersed phase material is controlled at 50±20 μL/min, the feed flow rate of the continuous phase material is controlled at 800±200 μL/min and the particle size of the polyvinyl alcohol microspheres for embolization prepared is 800±80 μm, preferably is 800±50 μm.

When the inner diameter of the dispersed phase tube is 800±400 μm and the inner diameter of the continuous phase tube is 2000±1000 μm, the feeding flow rate of the dispersed phase material is controlled at 50±20 μL/min, the feed flow rate of the continuous phase material is controlled at 5000±2500 μL/min and the particle size of the polyvinyl alcohol microspheres for embolization prepared is 1200±100 μm, preferably is 1200±50 μm.

When the inner diameter of the dispersed phase tube is 100±20 μm and the inner diameter of the continuous phase tube is 100±50 μm, the feeding flow rate of the dispersed phase material is controlled at 5±2 μL/min, the feed flow rate of the continuous phase material is controlled at 500±300 μL/min and the particle size of the polyvinyl alcohol microspheres for embolization prepared is 100±25 μm, preferably is 100±10 μm.

When the inner diameter of the dispersed phase tube is 80±10 μm and the inner diameter of the continuous phase tube is 100±20 μm, the feeding flow rate of the dispersed phase material is controlled at 5±1 μL/min, the feed flow rate of the continuous phase material is controlled at 300±100 μL/min and the particle size of the polyvinyl alcohol microspheres for embolization prepared is 80±25 μm.

When the inner diameter of the continuous phase tube is 1500±500 μm and the inner diameter of the dispersed phase tube is 500±200 μm, the feeding flow rate of the dispersed phase material is controlled at 10-500 μL/min, the feed flow rate of the dispersed phase material is controlled at 1000-50000 μL/min and the particle size of the polyvinyl alcohol microspheres for embolization prepared is 500-1400 μm.

The production process of microspheres for embolization provided by the present invention mainly includes three systems of a material feed system, a microsphere generation module and a curing apparatus, while containing an extension process device for stable, efficient, high-throughput preparation of microspheres.

In the present invention, the material feed system is divided into a dispersed phase material feed and a continuous phase material feed, and a suitable precision pump is selected as a drive apparatus depending on the chemical and fluid properties for the cooperation between the two phase materials, which is adapted to the requirements of feeding polymer materials, water-soluble materials and organic phase materials of different properties;

in the present invention, the microsphere generation module adopts micro-reactor apparatuses such as a chip type and a micro-tubular type with structures such as a focusing type, a T-shaped type and a co-axial type, and an oil-in-water or a water-in-oil structure may be formed from the dispersed phase under the mutual shearing force of the continuous phase by regulating the structure of microfluidic chip and running parameters, so that the precision in controlling the size of microsphere is reached to prepare microspheres with a homogeneous particle size through cross-linking and curing.

The present invention provides two curing apparatuses of a thermal curing apparatus and a light curing apparatus, wherein the two curing ways have the advantages of fast response time and high degree of cross-linking, so as to effectively improve the stability of products and provide more selectivities for the production process of microspheres with a homogeneous particle size.

The present invention has the following beneficial effects: in the present invention, with the micro-channel pipeline, closely-crosslinked, shape-ruled circular microspheres are formed finally by triggering the cross-linkage of polymerized molecules contained in the liquid beads on the surface of the liquid beads through the unique water-in-oil structure. The present invention represents an entire set of preparation process of polyvinyl alcohol microspheres for embolization with a homogeneous particle size, rather than only a certain component such as the micro-channel pipeline, and achieves the effect of forming the microspheres with a homogeneous particle size in the channel by crosslinking and polymerization, rather than just forming liquid beads.

The present invention may provide a systematized device for continuous and automatic preparation of polyvinyl alcohol microspheres for embolization with an adjustable size and a homogeneous particle size while covering stable and high efficient preparation of microspheres, and a corresponding production process of the same.

BRIEF DESCRIPTION OF THE DRAWINGS

Combined with the drawings, the above and other features and advantages of the present invention can be better understood through the detailed instructions described below, wherein:

FIG. 1 is a flow chart of a processing method of a reaction apparatus provided in Embodiment 2;

FIG. 2 is a structural diagram of a preparation device of microspheres for embolization provided in Embodiment 3;

FIG. 3 is a structural diagram of a preparation device of microspheres for embolization provided in Embodiment 4;

DESCRIPTION OF THE PREFERRED EMBODIMENTS

Figure 4:
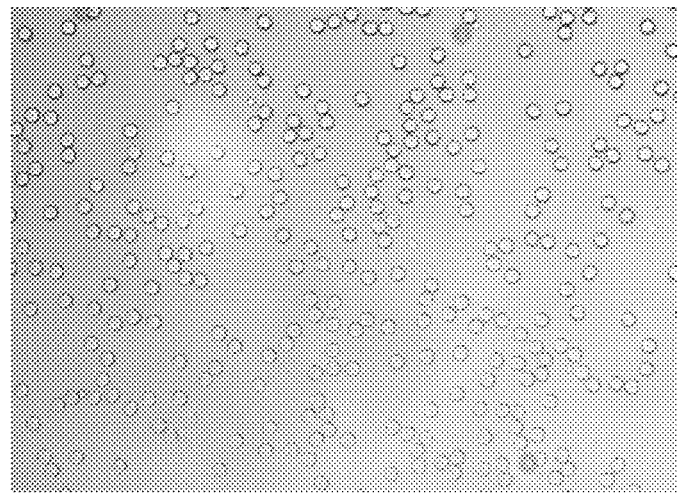
FIG. 4 is a diagram of polyvinyl alcohol microspheres for embolization of 40±20 µm.

With reference to the drawings showing the embodiments of the present invention, the present invention will be described in more detail below. However, the present invention may be implemented in many different forms and should not be interpreted as being subject to the limitations of the embodiment proposed here. In contrast, these embodiments are proposed in order to achieve full and complete disclosure, and to enable those skilled in the art to fully understand the scope of the present invention. In these figures, for clarity, the dimensions and relative dimensions of the layers and areas may have been enlarged.

It should be noted that all the directional indications (such as up, down, left, right, front, back, . . . ) in the embodiments of the present invention are only used to explain the relative positional relationship, motion situation and the like between the components under a specific attitude (as shown in the drawings), and if the specific attitude changes, then the directional indications also change accordingly.

Embodiment 1

The present invention provides a reaction apparatus including a main body structure layer and an encapsulation layer, the main body structure layer is integrated with a tube, and the encapsulation layer is stacked at one side of the main body structure layer; a melting temperature of the main body structure layer is higher than a melting temperature of the encapsulation layer, and the main body structure layer is connected to the encapsulation layer by way of thermal bonding.

The present invention further defines that the melting temperature of the main body structure layer is higher than that of the encapsulation layer, and the function of connection may be realized only when the thermal bonding temperature reaches the melting temperature of the encapsulation layer during the process of the thermal bonding connection while the thermal bonding temperature may also be realized to be lower than the melting temperature of the main body structure layer, so that the problems of collapse and deformation of the tubes for the inner formation grooves caused by the high thermal bonding temperature during the process of the thermal bonding connection may be prevented, thereby facilitating consistency of mass production and adaptability in mass production.

In the present embodiment, the main body structure layer and the encapsulation layer are made from the same material, wherein the same material mentioned here is a thermoplastic polymer material prepared based on the polymer reaction of the same type of monomer, and high molecular materials with different molecular weights or degrees of polymerization are prepared by controlling the scale and parameters of monomers and belong to the same material while having different melting temperatures.

For the reaction apparatus provided by the present embodiment, the main body structure layer and the encapsulation layer are made from the same material, which on the one hand improves the overall mechanical strength of the reaction apparatus, and on the other hand provides theoretical support for the thermal bonding connection between the two layers, as well as avoiding the introduction of impurities.

The reaction apparatus provided by the present invention has advantages such as integration, structural stability and high strength, as well as significantly improving the stability in generating liquid beads. Meanwhile the reaction apparatus has the advantages of high efficiency in making, good quality and adaptability in mass production, and is of great significance for the application of the reaction apparatus in the fields such as clinical diagnosis, drug analysis, environmental monitoring and food development.

In the present embodiment, the tube integrated in the main body structure layer includes a dispersed phase tube and a continuous phase tube, and the continuous phase tube and the dispersed phase tube are connected to the same end of a main tube, the continuous phase tube having a continuous phase feed inlet, the dispersed phase tube having a dispersed phase feed inlet, the main tube having a discharge outlet; the tube may be a flow-focusing tube or a co-axial tube or a T-shaped tube or a Y-shaped tube, which is not limited here and may be adjusted according to actual requirements.

In the present embodiment, an example where the main body structure layer is integrated with the flow-focusing tube is further described.

Specifically, the flow-focusing tube includes a main tube, a dispersed phase tube and two continuous phase tubes, the continuous phase tubes are arranged symmetrically, and the dispersed phase tube is arranged between the continuous phase tubes; both ends on the same sides of the continuous phase tubes and the dispersed phase tube are connected to and communicated with one end of the main tube, and the other end of the main tube extends to the end away from the dispersed tube and the continuous phase tubes.

Further, the end of the two continuous phase tube away from the main tube is provided with the continuous phase feed inlet, the end of the dispersed phase tube away from the main tube is provided with the dispersed phase feed inlet, and the end of the main tube away from the dispersed phase tube and the continuous phase tube is provided with the discharge outlet. A liquid enters the continuous phase tube and the dispersed phase tube from the continuous phase feed inlet and the dispersed phase feed inlet, and is generated into liquid beads stably under a shearing force at a position where the continuous phase tube and the dispersed phase tube are intersected with the main tube for outputting the liquid beads from the discharge outlet of the main tube. The provisions of the continuous phase feed inlet, the dispersed phase feed inlet and the discharge outlet realize the introduction and export of the fluid into and from the reaction apparatus, so as to achieve the functions of feeding the fluid and washing the tube.

Further, the ends of the two continuous phase tubes away from the main tube are communicated with each other and share one continuous phase feed inlet, which on the one hand increases the symmetry of the two continuous phase tubes for distributing the fluid uniformly and further improving the stability of generating the microspheres with the flow-focusing reaction apparatus, and on the other hand optimizes the structure, reduces the number of the feed inlet, promotes the rationality of the structure of the entire apparatus and reduces the use of pipelines required and adapters. Naturally, in other embodiments, the ends of the two continuous phase tubes away from the main tube may be not communicated with each other, and the ends are provided with an independent continuous phase feed inlet respectively, which may be adjusted according to actual requirements and is not limited here.

In the present embodiment, a diameter ratio of the dispersed phase tube feed inlet to the dispersed phase tube is 1:(1-2); a diameter ratio of the continuous phase tube feed inlet to the continuous phase tube is 1:(1-2). By defining that the diameter of the feed inlet is smaller than the diameter of the tube, the present embodiment ensures that the material may enter the inside of the tube entirely without any dead volume of the liquid.

Further, the continuous phase feed inlet, the dispersed phase feed inlet and the discharge outlet penetrates through the main body structure layer, and one ends of the continuous phase feed inlet, the dispersed phase feed inlet and the discharge outlet facing towards the encapsulation layer are sealed by the encapsulation layer while the other end being used for feeding and discharging the materials.

In the present embodiment, a diameter ratio of the continuous phase tube, the dispersed phase tube and the main tube is 1:(0.2-1):(1-1.5); for example, the diameter of the continuous phase tube is 50-1200 μm, the diameter of the dispersed phase tube is 50-1000 μm, and the diameter of the main tube is 50-1500 μm. In the present embodiment, by defining the above dimensions, wider droplets may be prepared while being more in line with the design ratio for the fluid and having a maximum shearing force, so that the droplets within a corresponding range maybe show with a minimum volume of fluid and the ratio range may be adjusted to be wider. Specific ratio values, as well as specific values, can be selected according to specific needs, which is not limited here.

In the present embodiment, the dispersed phase feed inlet is communicated with the dispersed phase tube through a connecting tube, and a diameter of the connecting tube is greater than a diameter of the dispersed phase tube. The diameter of the connecting tube is greater than that of the dispersed phase tube, which can reduce the inertial impact of the fluid and act as a buffer, so that the fluid may enter the dispersed phase tube smoothly, thereby improving the stability and the continuity of generating the droplets. Naturally, in other embodiments, the provision of the connecting tube may be eliminated, and specific adjustment may be performed according to actual requirements, which is not limited here.

Further, a position where the connecting tube is connected to the dispersed phase tube is shaped as a slope, and an inclination angle A of the slope ranges from 30° to 60°. The provision of the slope on the one hand buffers and introduces quickly the fluid into the dispersed tube, and on the other hand reduces the dead volume to change the fluid to another aspect quickly in a certain angle, wherein the specific value of the inclination angle can be adjusted according to the specific requirements, which is not limited here.

In the present embodiment, the discharge outlet has an inner hole diameter larger than an outer hole diameter; in this way, the pressure of the fluid may be released stably, and the mechanical strength of the reaction apparatus may be further enhanced. Specifically, the above implementation may be realized by methods such as designing the discharge outlet as a step-shaped hole or a horn-shaped hole, which is not limited here.

Further, a ratio of a minimum hole diameter of the discharge outlet to the diameter of the main tube is (1-1.5):1. For the conversion of the motion direction of fluid, the droplets will be collided to fuse or broke. With the above ratio, the droplets are converted with a gradient with the fluid, and the channels are magnified step by step. The droplets slowly shorten the distance therebetween in fluid motion without collision or breakage, which effectively improves the stability of the whole system.

In the present embodiment, the reaction apparatus further includes a support layer, and the support layer is stacked at the side of the encapsulation layer opposite to the main body structure layer; a thickness of the support layer is larger than thicknesses of the encapsulation layer and the main body structure layer, so as to ensure the mechanical strength. Naturally, in other embodiments, the thickness of the support layer may be smaller than or equal to the thicknesses of the encapsulation layer and the main body structure layer, which is not limited here and is adjusted according to actual situations. The support layer is mainly used for enable the support layer to cooperate with a fixture for realizing positioning and clamping when the following reaction apparatuses are clamped by the fixture. Naturally, in other embodiments, the arrangement of the support layer or combining the support layer with the encapsulation layer may be eliminated, which may be adjusted according to actual situations and is not limited here.

Preferably, the support layer, the main body structure layer and the encapsulation layer may be made from the same material, which facilitates the improvement of the overall mechanical strength. Naturally, in other embodiments, the support layer may be made from a material that is different from materials of the main body structure layer and the encapsulation layer, which is not limited here.

The support layer is connected to the main body structure layer by way of glued connection, wherein the glue may be selected from a double-sided glue, a photosensitive glue, a solvent glue and the like, which is not limited here and may be selected according to actual situations. The way of glued connection has the advantages of simplifying adhesive method, low cost, no need for heating and the like; naturally, in other embodiments, other connection methods may be selected according to requirements, which is not limited here.

In the present embodiment, a material thickness ratio of the main body structure layer to the encapsulation layer to the support layer is 1:(0.05-0.5):(1-3). The definition of the above ratio on the one hand increases the overall mechanical strength to enable the reaction apparatus to have a stronger support force during installation without causing breakage, and on the other hand ensures that the bonding process transfers heat quickly to reach the thermal balance quickly for achieving a high bonding strength due to the thickness of the encapsulation layer lower than that of the main body structure layer. Further, flatnesses of the main body structure layer, the encapsulation layer and the support layer are lower than 0.01 mm, so as to ensure a close and firm connection among them.

In the present embodiment, the main body structure layer and the encapsulation layer are made from a thermoplastic polymeric material, and the same type of thermoplastic polymeric material contains different degrees of polymerization, so as to have different melting temperatures. The thermoplastic polymeric material includes polymers such as methyl methacrylate, polycarbonate, cyclo olefin polymer, which facilitates the treatment for hydrophobic or hydrophilic surface coatings of the reaction apparatus, so as to meet the production needs of different types of microspheres.

Preferably, the main body structure layer and the encapsulation layer 1 are made from a cyclo olefin polymer; the material has a glass transition temperature (i.e. melting temperature) over a wide range of 90° C.-160° C., thereby facilitating the main body structure layer and the encapsulation layer to select the different degrees of polymerization of the thermoplastic polymeric material, thereby further distinguishing the melting temperatures of the main body structure layer and the encapsulation layer.

Embodiment 2

The present invention provides a processing method of a reaction apparatus, as shown in FIG. 1, which is used to process the reaction apparatus according to Embodiment 1.

The processing method of a reaction apparatus specifically includes:

S1, the main body structure layer and the encapsulation layer are processed according to Embodiment 1 respectively by using the same material, and a degree of polymerization of the material is controlled, wherein a melting temperature of the encapsulation layer obtained by processing is lower than a melting temperature of the main body structure layer obtained by processing; and S2, the main body structure layer obtained by processing is connected to the encapsulation layer obtained by processing by way of thermal bonding.

The main body structure layer is connected to the encapsulation layer by way of thermal bonding under a vacuum condition, which facilitates avoiding the introduction of impurities.

A thermal bonding temperature is lower than the melting temperature of the main body structure layer, and is higher than or equal to the melting temperature of the encapsulation layer, so as to ensure that the collapse or deformation of tubes in the main body structure layer is avoided while melting the encapsulation layer to achieve the encapsulation effect.

The thermal bonding temperature differs by 0.1-10% from the melting temperature of the main body structure layer. The thermal temperature enables the encapsulation layer to be melted and to be further bonded with the main body structure layer; by controlling the difference in the melting temperature of the main body structure layer and increasing the compatible temperature interval between the main body structure layer and the encapsulation layer, the encapsulation layer is quickly bonded with the main body structure layer, wherein if the temperature difference is too large, situations such as infirm adhesion and low bonding strength are prone to occur; therefore, the difference of the thermal bonding temperature and the melting temperature of the main body structure layer is controlled within a range of 0.1-10%.

The thermal bonding temperature has a range of 90-160° C., the thermal bonding time has a range of 3-30 min, the thermal bonding has a pressure range of 20-200 kg; the parameter range of the bonding is selected according to factors such as the nature of the material and the thickness ratio; the bonding pressure, the boding time, and the bonding temperature all play a decisive role, wherein when the three factors are too large, some adverse effects such as collapse and deformation of tubes, waste of energy and low efficiency may easily occur, and when the three factors are too small, problems such as low bonding strength, low adhesion and many residual products may easily occur. During the processing process, the thermal bonding temperature, the thermal bonding time and the thermal boding pressure may be selected according to specific needs; for example, the bonding pressure is 60 kg, the bonding temperature is 130° C. and the bonding time is 10 min, which is not limited here.

In the present embodiment, when the side of the encapsulation layer opposite to the main body structure layer is further provided with the support layer, the support layer is connected to the encapsulation layer by way of glued connection.

The bonding pressure range of 1-10 kg and the bonding time rage is 3-30 s between the support layer and the encapsulation layer. During the processing process, both the time and the pressure for gluing may be selected according to specific needs; for example, the bonding pressure range is 3 kg and the bonding time is 5 s, which is not limited here.

Embodiment 3

With reference to FIG. 2, the present invention provides a preparation device of microspheres for embolization including a feed system 1, a microsphere generation module 2 and a curing apparatus 3; the feed system 1 is connected to the microsphere generation module 2, the microsphere generation module 2 is connected to the curing apparatus 3, and the feed system 1 is used for providing materials to the microsphere generation module 2; the materials are reacted in the microsphere generation module 2 to generate droplets, and to obtain microspheres for embolization with a homogeneous particle size after being processed by the curing apparatus 3. The preparation device of microspheres for embolization provided by the present invention may be used to preparepolyvinyl alcohol microspheres for embolization, and may also be used to prepare microspheres of other types, which is not limited here. The preparation device of microspheres for embolization provided by the present invention mainly includes three systems of a material feed system, a microsphere generation module and a curing apparatus, while containing an extension process device for stable, efficient, high-throughput preparation of microspheres.

In the present embodiment, the microsphere generation module 2 includes at least one micro-reactor, and the micro-reactor adopts the reaction apparatus according to Embodiment 1. Further, the microsphere generation module 2 includes a plurality of the micro-reactors connected in parallel, and the plurality of micro-reactors are connected to the feed system 1 and the curing apparatus 3 respectively; the plurality of micro-reactors run in parallel, which may realize mass production, and the plurality of micro-reactors have advantages of independence and anti-interference.

The number of the micro-reactors may be one, or eight as shown in FIG. 2, or other number, which is not limited here and may be adjusted according to specific situations.

The plurality of micro-reactors may be used for generating the microspheres with the same diameter or different diameters, and an inner diameter of the channel for generating the droplets in the micro-reactor is 20-2000 μm. Specifically, the microspheres with a homogeneous particle size with different sizes may be prepared by controlling factors such as the diameter of the tube for generating the droplets and the running parameters of the liquid in the micro-reactor, with an adjustable range of the size of microsphere within 20-1400 um and a homogeneity of particle size of less than 10%, which is not limited here and may be adjusted according to specific needs.

In the present embodiment, each of the micro-reactors further includes a microfluidic chip, and the microfluidic chip cooperates with a controller to control a flow rate of a reaction fluid flowing into the micro-reactor for controlling the flow rate to control the particle size of the microsphere.

In the present invention, the microsphere generation module adopts the micro-reactors such as a chip type and a micro-tubular type with structures such as a focusing type, a T-shaped type and a co-axial type, and an oil-in-water or a water-in-oil structure may be formed from the dispersed phase material under the mutual shearing force of the continuous phase material by regulating the structure of microfluidic chip and running parameters, so that the precision in controlling the size of microsphere is reached to prepare microspheres with a homogeneous particle size through cross-linking and curing.

In the present embodiment, the feed system includes a continuous phase feed system 11 for feeding the oil phase material and a dispersed phase feed system 12 for feeding the water phase material; the continuous phase feed system 11 is connected to the continuous phase feed inlet of each of the micro-reactors respectively, and the dispersed phase feed system 12 is connected to the dispersed phase feed inlet of each of the micro-reactors respectively. In the present invention, the material feed system is divided into a dispersed phase material feed and a continuous phase material feed, and a suitable precision pump is selected as a drive apparatus depending on the chemical and fluid properties for the cooperation between the two phase materials, which is adapted to the requirements of feeding polymer materials, water-soluble materials and organic phase materials of different properties;

Further, the continuous phase feed system 11 includes a first pressure source apparatus 111, a continuous phase feed pump 112 and a continuous phase storage tube 113 that are connected with each other in sequence, and the continuous phase storage tube 113 is connected to the continuous phase feed inlet of each of the micro-reactors respectively; the continuous phase storage tube 113 is used to store the oil phase material, the first pressure source apparatus 111 is used to provide a pressure for the continuous phase feed pump 112, and the continuous phase feed pump 112 is used to push the material in the continuous phase storage tube 113 to transport the material to the continuous phase feed inlet of each of the micro-reactors through the pipeline, so as to realize feeding the oil phase material.

The dispersed phase feed system 12 includes a second pressure source apparatus 121, a dispersed phase feed pump 122 and a dispersed phase storage tube 123 that are connected with each other in sequence, and the dispersed phase storage tube 123 is connected to the dispersed phase feed inlet of each of the micro-reactors respectively; the dispersed phase storage tube 123 is used to store the water phase material, the second pressure source apparatus 121 is used to provide a pressure for the dispersed phase feed pump 122, and the dispersed phase feed pump 122 is used to push the material in the dispersed phase storage tube 123 to transport the material to the dispersed phase feed inlet of each of the micro-reactors through the pipeline, so as to realize feeding the dispersed phase material.

In the present embodiment, both the continuous phase feed pump 112 and the dispersed phase feed pump 122 are pressure pumps, which are required to be used in cooperation with the pressure source apparatus to press the material stored in the continuous phase storage tube 113 and the dispersed phase storage tube 123 into the micro-reactor through the pressure.

Further, the first pressure source apparatus 111 and the second pressure apparatus 121 may specifically be apparatuses such as a nitrogen cylinder and a gas compressor, which is not limited here and may be selected according to specific needs.

Further, the continuous phase feed pump 112 and the dispersed phase feed pump 122 preferably adopt a pump structure with pressure and flow control apparatuses, so as to control the flow and the pressure of the feed. In the present embodiment, preferably, the flow rate of the dispersed phase is controlled at 0.1-500 μL/min, and the flow rate of the continuous phase is controlled at 100-50000 μL/min, so as to the material is transported to each of the micro-reactors stably and continuously with high throughput.

The continuous phase feed pump 112 and the dispersed phase feed pump 122 specifically may select structures such as a precision pressure pump, a high precision injection pump and a high precision constant current pump. The precision pressure pump has a range of 0-4 bar and a precision of 0.01%-0.2%, and may be purchased from domestic and foreign suppliers, e.g., corporations such as Suzhou Wenhao Co. Ltd. and U.S.A. Dolomite; the high-precision injection pump offers a variety of operating modes that enable them to adapt to a wide range of applications in different fields and itself has a high control accuracy and a wide line speed range, with an optional flow range of 0.001 μL/h-50 mL/min, and may be purchased from domestic and foreign suppliers, e.g., corporations such as Baoding Longer Precision Pump Co., Ltd. and MS Analysis And Test Technology (shanghai) Co. Ltd.; the high-precision constant current pump has a high pressure and a high head, transports materials without contacting the outside world, has a precision of 0.01-1000 mL/min and may be purchased from domestic and foreign suppliers, e.g., corporations such as Baoding Longer Precision Pump Co., Ltd. and Shanghai Precision Instruments Co. Ltd.

In the present embodiment, the discharge outlet of each of the micro-reactors is communicated with the curing apparatus 3, and the droplets generated in each of the micro-reactors are transported to the curing apparatus 3 for curing to obtain the microspheres for embolization. The curing apparatus 3 is an ultraviolet curing apparatus or a thermal curing apparatus and the like, both of which include curing containers and corresponding generation apparatuses. The present invention provides two curing apparatuses of a thermal curing apparatus and a light curing apparatus, wherein the two curing ways have the advantages of fast response time and high degree of cross-linking, so as to effectively improve the stability of products and provide more selectivities for the production process of microspheres with a homogeneous particle size.

Taking the preparation of polyvinyl alcohol microspheres for embolization as an example for further description, if the initiator is a chemical initiator in the polyvinyl alcohol material, the curing apparatus is a thermal curing apparatus consisting of a double-layered reaction flask, a mechanical stirring tube and a constant temperature water bath tube, wherein during the reaction process, the fluid is stirred uniformly and mechanically, the constant temperature water bath tube offers energy conduction to reach the reaction conditions for thermal curing, and finally enriching and crosslinking reactions of the product are realized.

If the initiator is a photoinitiator in the polyvinyl alcohol material, the curing apparatus is a light curing apparatus, the light curing apparatus adopts an ultraviolet light for irradiation with an intensity of 10-1000 W, and the generated microspheres are induced by the UV light for polymerization in the pipeline to achieve crosslinking polymerization of the product. Both two kinds of curing methods may quickly cross-link the polymeric microspheres to improve the stability of the product, as well as effectively improving formation way and speed of the microspheres and promoting the simplicity of the production process of the polyvinyl alcohol microspheres for embolization.

In the present embodiment, as shown in FIG. 2, the curing treatment is performed by using two curing methods simultaneously of the thermal curing and the light curing; however, in other embodiments, only one of the curing methods may be used, for example, only the thermal curing method is used (as shown in FIG. 3), or only the light curing method is used, which specifically is based on the actual needs and will not be repeated here.

In addition, the assembly of each module of the preparation device of microspheres for embolization is based on the connection among fittings such as plastic tubular members, metal tubes, threaded sleeve tubes, washers and adapters so that the sleeve tubes and the metal tubes with outer threads may have a highly-close interface with the chips and the micro tubes while enabling the liquid to rely on the plastic tubular members for fluid transport; for example, tubular members such as PTFE tube with an inner diameter of 100-3200 um and PEEK tube with an inner diameter of 100-3200 um may be used, and these tubular members have the advantages of good flexibility, smoothness, non-toxicity, etc., which guarantees the connection of the whole process.

The preparation device of microspheres for embolization provided by the present invention has the following advantages:

in the present invention, with the micro-channel pipeline, closely-crosslinked, shape-ruled circular microspheres are formed finally by triggering the cross-linkage of polymerized molecules contained in the liquid beads on the surface of the liquid beads through the unique water-in-oil structure; the present invention represents an entire set of preparation device of microspheres for embolization, rather than only a certain component such as the micro-channel pipeline, and achieves the effect of forming the microspheres with a homogeneous particle size in the channel by crosslinking and polymerization, rather than just forming liquid beads. The present invention may provide a systematized device for continuous and automatic preparation of polyvinyl alcohol microspheres for embolization with an adjustable size and a homogeneous particle size while covering stable and high efficient preparation of microspheres, and a corresponding production process of the same.

Embodiment 4

The present embodiment is an adjustment based on Embodiment 3.

Specifically, as shown in FIG. 3, in the present embodiment, the continuous phase feed system 11 includes a continuous phase feed pump 112 and a continuous phase storage tube 113 that are directly connected with each other, and the dispersed phase feed system 12 includes a dispersed phase feed pump 122 and a dispersed phase storage tube 123 that are directly connected with each other.

In the present embodiment, the continuous phase feed pump 112 and the dispersed phase feed pump 122 adopt a non-pressure pump structure, e.g., a pump structure of suction type, which is directly arranged on the pipeline where the continuous phase storage tube 113 and the dispersed phase storage tube 123 are communicated with the micro-reactor, as shown in FIG. 3.

In the present embodiment, other structures of the preparation device of microspheres for embolization may all refer to the description according to Embodiment 3, which is not limited here.

Embodiment 5

The present invention provides a preparation method of microspheres for embolization, which will be described specifically with the polyvinyl alcohol microspheres for embolization as an example.

In the present embodiment, a precision pressure pump is used to transport the material and the micro-reactor is a focusing chip, wherein an inner diameter of the dispersed phase pipe is 20±10 μm, and an inner diameter of the continuous phase pipe is 20±10 μm. The method specifically includes the following steps:

(1) preparation of dispersed phase material: 0.4 g potassium persulfate is weighed and 100 g water is added, which are stirred and dissolved magnetically; 10 g sodium acrylic is slowly dripped and stirred uniformly, and 10 g derivatives of polyvinyl alcohol are added, which are stirred uniformly, so as to obtain the dispersed phase material for future use.

(2) preparation of continuous phase material: 10 g surfactant of fatty acid sorbate is added to 1000 mL ethyl acetate solution, and then 10 mL triethanolamine is added, which is stirred uniformly, so as to obtain the continuous phase material for future use.

(3) assembly of apparatuses: the prepared dispersed phase material and continuous phase material are added to a liquid storage bottle, and apparatuses such as a pressure control module, a gas source, a computer control panel and pipelines are connected with each other; first, an initialization apparatus is initiated to verify whether the gas in the liquid storage bottle is exposed and confirm the excellent air tightness. A plurality of micro-reactors (8 reactors shown in FIG. 2) are arranged in parallel in sequence, with pipelines connected to the pipelines of the discharge outlet through adapters respectively, and the outlet pipelines of the micro-reactors are communicated with the curing apparatus, wherein the curing apparatus adopts the thermal curing method and is connected to a constant temperature heating and recycling apparatus.

(4) preparation of microspheres with a homogeneous particle size: a pressure switch of the dispersed phase is initiated, the dispersed phase material is transported to the chip pipeline while initiating a pressure switch of the continuous phase, and then the continuous phase material is quickly transported to the pipeline of the micro-reactor; by regulating the relationship between the pressure and the flow rate, the feed flow rate of the dispersed phase material is controlled at 0.1-2 μL/min, and the feed flow rate of the continuous phase material is controlled at 400±200 μL/min; at a focusing intersection of the chip, the dispersed phase material is shorn into small liquid beads by the oil continuous phase material to form the water-in-oil structure, and then further transported to the curing apparatus to be stirred and cured for 2 h under 80° C. The microspheres with a homogeneous particle size are cooled to room temperature, washed with butyl acetate, ethyl acetate and acetone respectively, vacuum-dried, and then swelled, so as to obtain the polyvinyl alcohol microspheres for embolization with a homogeneous particle size.

(5) analysis of particle size: the particle size of the microspheres is distributed uniformly, the output is higher, and mass production may be realized. The particle size of the prepared polyvinyl alcohol microspheres for embolization is 20±10 μm, preferably 20±5 μm, which meets the requirement for homogeneous particle size.

Embodiment 6

The present invention provides a preparation method of microspheres for embolization, which will be described specifically with the polyvinyl alcohol microspheres for embolization as an example.

In the present embodiment, a precision pressure pump is used to transport the material and the micro-reactor is a focusing chip, wherein an inner diameter of the dispersed phase pipe is 60±10 μm, and an inner diameter of the continuous phase pipe is 90±50 μm. The method specifically includes the following steps:

(1) preparation of dispersed phase material: 0.4 g potassium persulfate is weighed and 100 g water is added, which are stirred and dissolved magnetically; 10 g sodium acrylic is slowly dripped and stirred uniformly, and 10 g derivatives of polyvinyl alcohol are added, which are stirred uniformly, so as to obtain the dispersed phase material for future use.

(2) preparation of continuous phase material: 10 g surfactant of fatty acid sorbate is added to 1000 mL butyl acetate solution, and then 10 mL triethanolamine is added, which is stirred uniformly, so as to obtain the continuous phase material for future use.

(3) assembly of apparatuses: the prepared dispersed phase material and continuous phase material are added to a liquid storage bottle, and apparatuses such as a pressure control module, a gas source, a computer control panel and pipelines are connected with each other; first, an initialization apparatus is initiated to verify whether the gas in the liquid storage bottle is exposed and confirm the excellent air tightness. A plurality of micro-reactors are arranged in parallel in sequence, with pipelines connected to the pipelines of the discharge outlet through adapters respectively, and the outlet pipelines of the micro-reactors are communicated with the curing apparatus, wherein the curing apparatus adopts the thermal curing method and is connected to a constant temperature heating and recycling apparatus.

(4) preparation of microspheres with a homogeneous particle size: a pressure switch of the dispersed phase is initiated, the dispersed phase material is transported to the chip pipeline while initiating a pressure switch of the continuous phase, and then the continuous phase material is quickly transported to the pipeline of the micro-reactor; by regulating the relationship between the pressure and the flow rate, the feed flow rate of the dispersed phase material is controlled at 2±1 μL/min, and the feed flow rate of the continuous phase material is controlled at 200±100 μL/min; at a focusing intersection of the chip, the dispersed phase material is shorn into small liquid beads by the oil continuous phase material to form the water-in-oil structure, and then further transported to the curing apparatus to be stirred and cured for 2 h under 80° C. The microspheres with a homogeneous particle size are cooled to room temperature, washed with butyl acetate, ethyl acetate and acetone respectively, vacuum-dried, and then swelled, so as to obtain the polyvinyl alcohol microspheres for embolization with a homogeneous particle size.

(5) analysis of particle size: as shown in FIG. 4, the particle size of the microspheres is distributed uniformly, the output is higher, and mass production may be realized. The particle size of the prepared polyvinyl alcohol microspheres for embolization is 40±20 m, preferably 40±10 m, which meets the requirement for homogeneous particle size.

Embodiment 7

The present invention provides a preparation method of microspheres for embolization, which will be described specifically with the polyvinyl alcohol microspheres for embolization as an example.

In the present embodiment, a precision pressure pump and an injection pump are used to transport the material and the micro-reactor is a focusing chip, wherein an inner diameter of the dispersed phase pipe is 100±20 μm, and an inner diameter of the continuous phase pipe is 300±150 μm; by controlling the flow rate of the dispersed phase and the continuous phase, preparing the microspheres with a homogeneous particle size has the following steps:

(1) preparation of dispersed phase material: 0.4 g ammonium persulfate is weighed and 60 g water is added, which are stirred and dissolved magnetically; 8 g 2-acrylamido-2-methyl-1-propanesulfonic acid is slowly dripped and stirred uniformly, and 10 g derivatives of polyvinyl alcohol are added, which are stirred uniformly, so as to obtain the dispersed phase material for future use.

(2) preparation of continuous phase material: 10 g surfactant of fatty acid sorbate is added to 1000 mL butyl acetate solution, and then 8 mL tetramethylethylenediamine is added, which is stirred uniformly, so as to obtain the continuous phase material for future use.

(3) assembly of apparatuses: the injection pump is opened to automatically sucked the prepared dispersed phase into the injection pump; a control module of the precision pressure pump is connected, the oil phase material is placed into the material storage tube, and the two feed outlet pipelines are connected to the chip pipeline correspondingly; 4 chips are arranged in parallel in sequence, with pipelines connected to the pipelines of the discharge outlet through adapters respectively, and the outlet pipelines of the chip are communicated with the curing apparatus, wherein the curing apparatus adopts the thermal curing method and is connected to a constant temperature heating and recycling apparatus.

(4) preparation of microspheres with a homogeneous particle size: parameters of the injection pump are set, and the feed flow rate is set at 5±2 μL/min; parameters of the pressure pump are set, and the feed flow rate is set at 800±300 μL/min. The injection pump is opened to push the dispersed phase material to the chip pipeline while opening the precision pressure pump, and the continuous phase material is quickly transported to the chip pipeline; at a focusing intersection of the chip, the dispersed phase material is shorn into small liquid beads by the oil continuous phase material to form the water-in-oil structure, and then further transported to the curing apparatus to be stirred and cured for 3 h under 60° C. The microspheres with a homogeneous particle size are cooled to room temperature, washed with butyl acetate, ethyl acetate and acetone respectively, vacuum-dried, and then swelled, so as to obtain the polyvinyl alcohol microspheres for embolization with a homogeneous particle size.

Figure 5:
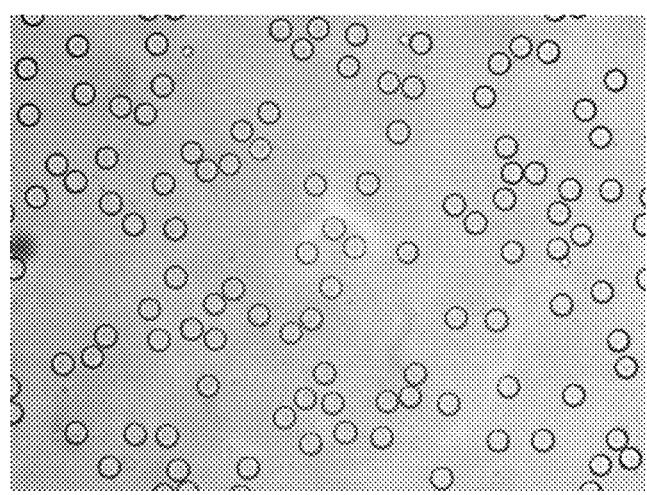
FIG. 5 is a diagram of polyvinyl alcohol microspheres for embolization of 100±25 µm.

(5) analysis of particle size: as shown in FIG. 5, the particle size of the microspheres is distributed uniformly, the output is higher, and mass production may be realized. The particle size of the prepared polyvinyl alcohol microspheres for embolization is 100±25 μm, preferably 100±10 μm, which meets the requirement for homogeneous particle size.

Embodiment 8

The present invention provides a preparation method of microspheres for embolization, which will be described specifically with the polyvinyl alcohol microspheres for embolization as an example.

In the present embodiment, a precision injection pump and a precision constant current pump are used to transport the material and the microsphere generation apparatus is a focusing chip, wherein an inner diameter of the dispersed phase pipe is 100±20 μm, and an inner diameter of the continuous phase pipe is 300±150 μm. As shown in FIG. 3, specifically, the steps are as follows:

(1) preparation of dispersed phase material: 0.4 g ammonium persulfate is weighed and 60 g water is added, which are stirred and dissolved magnetically; 8 g 2-acrylamido-2-methyl-1-propanesulfonic acid is slowly dripped and stirred uniformly, and 10 g derivatives of polyvinyl alcohol are added, which are stirred uniformly, so as to obtain the dispersed phase material for future use.

(2) preparation of continuous phase material: 10 g surfactant of fatty acid sorbate is added to 1000 mL butyl acetate solution, and then 8 mL tetramethylethylenediamine is added, which is stirred uniformly, so as to obtain the continuous phase material for future use.

(3) assembly of apparatuses: the injection pump is opened to automatically sucked the prepared dispersed phase into the injection pump; a feed pipeline of the precision constant current pump is inserted into the prepared continuous phase material, and the two feed outlet pipelines are connected to the chip pipeline correspondingly; 4 chips are arranged in parallel in sequence, with pipelines connected to the pipelines of the discharge outlet through adapters respectively, and the outlet pipelines of the chip are communicated with the curing apparatus, wherein the curing apparatus adopts the thermal curing method and is connected to a constant temperature heating and recycling apparatus.

(4) preparation of microspheres with a homogeneous particle size: parameters of the injection pump are set, and the feed flow rate is set at 5±2 μL/min; parameters of the constant current pump are set, and the feed flow rate is set at 500±200 μL/min. The injection pump is opened to push the dispersed phase material to the chip pipeline while opening the precision constant current pump, and the continuous phase material is quickly transported to the chip pipeline; at a focusing intersection of the chip, the dispersed phase material is shorn into small liquid beads by the oil continuous phase material to form the water-in-oil structure, and then further transported to the curing apparatus to be stirred and cured for 3 h under 60° C. The microspheres with a homogeneous particle size are cooled to room temperature, washed with butyl acetate, ethyl acetate and acetone respectively, vacuum-dried, and then swelled, so as to obtain the polyvinyl alcohol microspheres for embolization with a homogeneous particle size.

Figure 6:
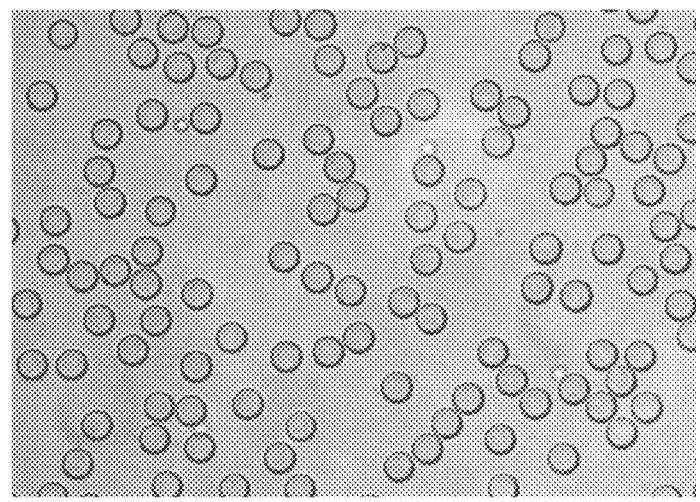
FIG. 6 is a diagram of polyvinyl alcohol microspheres for embolization of 250±50 µm.

(5) Analysis of particle size: as shown in FIG. 6, the particle size of the prepared polyvinyl alcohol microspheres for embolization is 250±50 μm, preferably 250±20 μm, which meets the requirement for homogeneous particle size.

Embodiment 9

The present invention provides a preparation method of microspheres for embolization, which will be described specifically with the polyvinyl alcohol microspheres for embolization as an example.

In the present embodiment, a precision injection pump and a precision constant current pump are used to transport the material and the microsphere generation apparatus is a 3D print cross-type pipeline, wherein an inner diameter of the dispersed phase pipe is 250±130 μm, and an inner diameter of the continuous phase pipe is 500±200 μm, with specific steps as follows:

(1) preparation of dispersed phase material: 0.4 g potassium persulfate is weighed and 100 g water is added, which are stirred and dissolved magnetically; 8 g 2-acrylamido-2-methyl-1-propanesulfonic acid is slowly dripped and stirred uniformly, and 10 g derivatives of polyvinyl alcohol are added, which are stirred uniformly, so as to obtain the dispersed phase material for future use.

(2) preparation of continuous phase material: 10 g surfactant of cellulose acetate is added to 1000 mL butyl acetate solution, and then 5 mL N,N-dimethylaniline is added, which is stirred uniformly, so as to obtain the continuous phase material for future use.

(3) assembly of apparatuses: the injection pump is opened to automatically sucked the prepared dispersed phase into the injection pump; a feed pipeline of the precision constant current pump is inserted into the prepared continuous phase material, and the two feed outlet pipelines are connected respectively to the chip pipeline correspondingly; the cross-type pipelines are connected to the pipelines of the discharge outlet through adapters respectively, and the outlet pipelines of the chip are communicated with the curing apparatus, wherein the curing apparatus adopts the thermal curing method and is connected to a constant temperature heating and recycling apparatus.

(4) preparation of microspheres with a homogeneous particle size: parameters of the injection pump are set, and the feed flow rate is set at 20±5 μL/min; parameters of the constant current pump are set, and the feed flow rate is set at 2000±500 μL/min. The injection pump is opened to push the dispersed phase material to the chip pipeline while opening the precision constant current pump, and the continuous phase material is quickly transported to the cross-type pipeline; at a center of the cross-type pipeline, the dispersed phase material is shorn into small liquid beads by the oil continuous phase material to form the water-in-oil structure, and then further transported to the curing apparatus to be stirred and cured for 3 h under 60° C. The microspheres with a homogeneous particle size are cooled to room temperature, washed with butyl acetate, ethyl acetate and acetone respectively, vacuum-dried, and then swelled, so as to obtain the polyvinyl alcohol microspheres for embolization with a homogeneous particle size.

Figure 7:
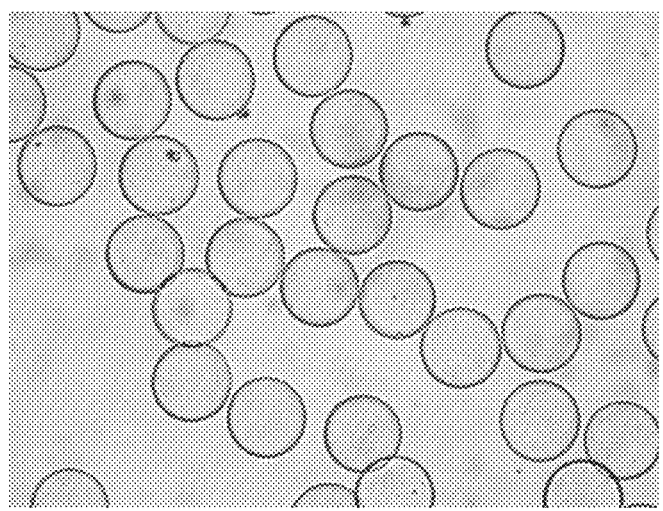
FIG. 7 is a diagram of polyvinyl alcohol microspheres for embolization of 500±50 µm.

(5) Analysis of particle size: as shown in FIG. 7, the particle size of the prepared polyvinyl alcohol microspheres for embolization is 500±50 μm, preferably 500±20 μm, which meets the requirement for homogeneous particle size.

Embodiment 10

The present invention provides a preparation method of microspheres for embolization, which will be described specifically with the polyvinyl alcohol microspheres for embolization as an example.

In the present embodiment, a precision pressure pump is used to transport the material and the microsphere generation apparatus is a T-shaped chip, wherein an inner diameter of the dispersed phase pipe is 800±300 μm, and an inner diameter of the continuous phase pipe is 1000±500 μm, using the light curing apparatus, with specific steps as follows:

(1) preparation of dispersed phase material: 0.15 g 2,4,6-trimethylbenzoyldiphenyl phosphine oxide is weighed and 80 g water is added, which are stirred and dissolved magnetically; 10 g 2-acrylamido-2-methyl-1-propanesulfonic acid is slowly dripped and stirred uniformly, and 10 g derivatives of polyvinyl alcohol are added, which are stirred uniformly, so as to obtain the dispersed phase material for future use.

(2) preparation of continuous phase material: 20 g surfactant of cellulose acetate is added to 2000 mL butyl acetate solution, which is stirred uniformly, so as to obtain the continuous phase material for future use.

(3) assembly of apparatuses: the prepared dispersed phase material and continuous phase material are added to a liquid storage bottle, and apparatuses such as a pressure control module, a gas source, a computer control panel and pipelines are connected with each other; first, an initialization apparatus is initiated to confirm the excellent air tightness. A plurality of chips are arranged in parallel in sequence, with pipelines connected to the pipelines of the discharge outlet through adapters respectively, and the outlet pipelines of the microreactors are communicated with the curing apparatus, wherein the curing apparatus adopts the light curing apparatus, which is connected to a UV light.

(4) preparation of microspheres with a homogeneous particle size: a pressure switch of the dispersed phase is initiated, the dispersed phase material is transported to the chip pipeline while initiating a pressure switch of the continuous phase, and then the continuous phase material is quickly transported to the pipeline of the micro-reactor; by regulating the relationship between the pressure and the flow rate, the feed flow rate of the dispersed phase material is controlled at 50±20 μL/min, and the feed flow rate of the dispersed phase material is controlled at 800±200 μL/min; at the T-shaped pipeline of the chip, the dispersed phase material is shorn into small liquid beads by the oil continuous phase material to form the water-in-oil structure. The UV light apparatus is opened with a power of 400 W, the UV light performs surface light curing with a light curing time of 40 s while the microspheres running in the coils, and then the microspheres are quickly cross-linked to prepare the product, followed by washing with butyl acetate, ethyl acetate and acetone, and vacuum-drying and swelling, so as to obtain the polyvinyl alcohol microspheres for embolization with a homogeneous particle size.

Figure 8:
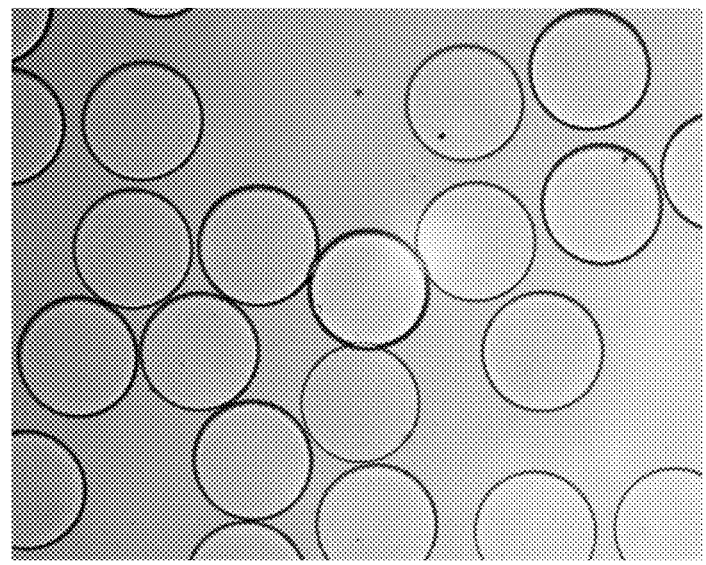
FIG. 8 is a diagram of polyvinyl alcohol microspheres for embolization of 800±80 µm.

(5) analysis of particle size: as shown in FIG. 8, the particle size of the microspheres is distributed uniformly, the output is higher, the curing time is shorter and mass production may be realized. The particle size of the prepared polyvinyl alcohol microspheres for embolization is 800±80 μm, preferably 800±50 μm, which meets the requirement for homogeneous particle size.

Embodiment 11

The present invention provides a preparation method of microspheres for embolization, which will be described specifically with the polyvinyl alcohol microspheres for embolization as an example.

In the present embodiment, a precision pressure pump is used to transport the material and the microsphere generation apparatus is a T-shaped chip, wherein an inner diameter of the dispersed phase pipe is 800±400 μm, and an inner diameter of the continuous phase pipe is 2000±1000 μm. The method specifically includes the following steps:

(1) preparation of dispersed phase material: 0.4 g potassium persulfate is weighed and 50 g water is added, which are stirred and dissolved magnetically; 10 g 2-acrylamido-2-methyl-1-propanesulfonic acid is slowly dripped and stirred uniformly, and 10 g derivatives of polyvinyl alcohol are added, which are stirred uniformly, so as to obtain the dispersed phase material for future use.

(2) preparation of continuous phase material: 10 g surfactant of cellulose acetate is added to 1000 mL butyl acetate solution, and then 10 mL tetramethylethylenediamine is added, which is stirred uniformly, so as to obtain the continuous phase material for future use.

(3) assembly of apparatuses: the prepared dispersed phase material and continuous phase material are added to a liquid storage bottle, and apparatuses such as a pressure control module, a gas source, a computer control panel and pipelines are connected with each other; first, an initialization apparatus is initiated to verify whether the gas in the liquid storage bottle is exposed and confirm the excellent air tightness. The T-shaped chips are arranged in parallel in sequence, with pipelines connected to the pipelines of the discharge outlet through adapters respectively, and the outlet pipelines of the chips are communicated with the curing apparatus, wherein the curing apparatus adopts the coil pre-curing method and the thermal curing method and is connected to a constant temperature heating and recycling apparatus.

(4) preparation of microspheres with a homogeneous particle size: a pressure switch of the dispersed phase is initiated, the dispersed phase material is transported to the chip pipeline while initiating a pressure switch of the continuous phase, and then the continuous phase material is quickly transported to the pipeline of the micro-reactor; by regulating the relationship between the pressure and the flow rate, the feed flow rate of the dispersed phase material is controlled at 50±20 μL/min, and the feed flow rate of the continuous phase material is controlled at 5000±2500 μL/min; at a focusing intersection of the chip, the dispersed phase material is shorn into liquid beads by the oil continuous phase material to form the water-in-oil structure, and the microspheres are prevented from collision and fusion after entering the curing apparatus when the microspheres are pre-cured in the coils and then further transported to the curing apparatus to be stirred and cured for 4 h under 80° C. The microspheres with a homogeneous particle size are cooled to room temperature, washed with butyl acetate, ethyl acetate and acetone respectively, vacuum-dried, and then swelled, so as to obtain the polyvinyl alcohol microspheres for embolization with a homogeneous particle size.

Figure 9:
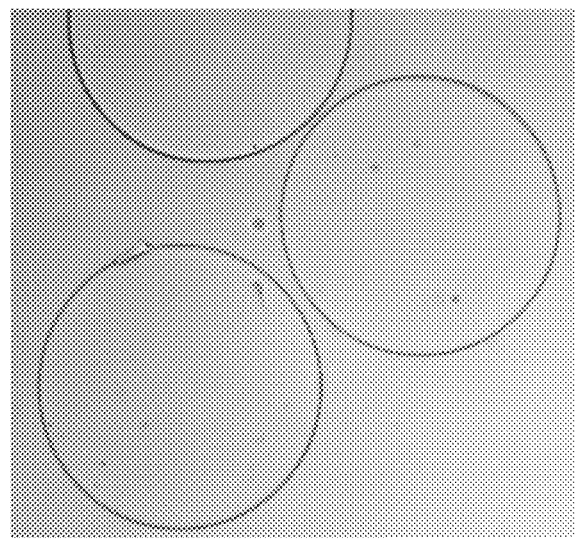
FIG. 9 is a diagram of polyvinyl alcohol microspheres for embolization of 1200±100 µm.

(5) analysis of particle size: as shown in FIG. 9, the particle size of the microspheres is distributed uniformly, the output is higher, and mass production may be realized. The particle size of the prepared polyvinyl alcohol microspheres for embolization is 1200±100 μm, preferably 1200±50 μm, which meets the requirement for homogeneous particle size.

Embodiment 12

The present invention provides a preparation method of microspheres for embolization, which will be described specifically with the polyvinyl alcohol microspheres for embolization as an example.

In the present embodiment, a precision pressure pump is used to transport the material and the microsphere generation apparatus is a focusing chip, wherein an inner diameter of the dispersed phase pipe is 100±20 μm, and an inner diameter of the continuous phase pipe is 100±50 μm, using the light curing apparatus. The method specifically includes the following steps:

(1) preparation of dispersed phase material: 0.2 g lithium phenyl-2,4,6-trimethylbenzoylphosphinate is weighed and 80 g water is added, which are stirred and dissolved magnetically; 10 g 2-acrylamido-2-methyl-1-propanesulfonic acid is slowly dripped and stirred uniformly, and 10 g derivatives of polyvinyl alcohol are added, which are stirred uniformly, so as to obtain the dispersed phase material for future use.

(2) preparation of continuous phase material: 20 g surfactant of cellulose acetate is added to 2000 mL butyl acetate solution, which is stirred uniformly, so as to obtain the continuous phase material for future use.

(3) assembly of apparatuses: the prepared dispersed phase material and continuous phase material are added to a liquid storage bottle, and apparatuses such as a pressure control module, a gas source, a computer control panel and pipelines are connected with each other; first, an initialization apparatus is initiated to verify whether the gas in the liquid storage bottle is exposed and confirm the excellent air tightness. A plurality of chips are arranged in parallel in sequence, with pipelines connected to the pipelines of the discharge outlet through adapters respectively, and the outlet pipelines of the micro-reactors are communicated with the curing apparatus, wherein the curing apparatus adopts the light curing apparatus, which is connected to a UV light.

(4) preparation of microspheres with a homogeneous particle size: a pressure switch of the dispersed phase is initiated, the dispersed phase material is transported to the chip pipeline while initiating a pressure switch of the continuous phase, and then the continuous phase material is quickly transported to the pipeline of the micro-reactor; by regulating the relationship between the pressure and the flow rate, the feed flow rate of the dispersed phase material is controlled at 5±2 μL/min, and the feed flow rate of the continuous phase material is controlled at 500±300 μL/min; at the focusing intersection of the chip, the dispersed phase material is shorn into small liquid beads by the oil continuous phase material to form the water-in-oil structure. The UV light apparatus is opened with a power of 1000 W, the UV light performs surface light curing with a light curing time of 60 s while the microspheres running in the coils, and then the microspheres are quickly cross-linked to prepare the product, followed by washing with butyl acetate, ethyl acetate and acetone, and vacuum-drying and swelling, so as to obtain the polyvinyl alcohol microspheres for embolization with a homogeneous particle size.

Figure 10:
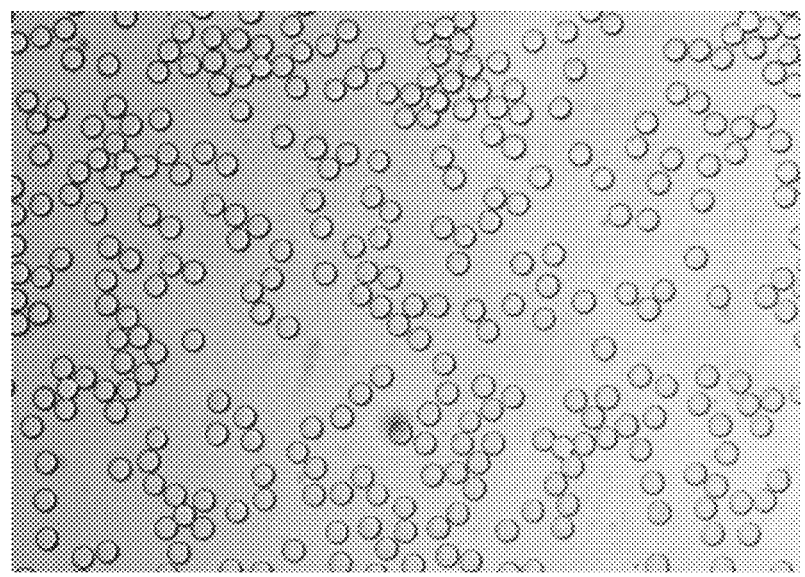
FIG. 10 is a diagram of polyvinyl alcohol microspheres for embolization of 100±25 µm.

(5) analysis of particle size: as shown in FIG. 10, the particle size of the microspheres is distributed uniformly, the output is higher, the curing time is shorter, and mass and rapid production may be realized. The particle size of the prepared polyvinyl alcohol microspheres for embolization is 100±25 μm, preferably 100±10 μm, which meets the requirement for homogeneous particle size.

Embodiment 13

The present invention provides a preparation method of microspheres for embolization, which will be described specifically with the polyvinyl alcohol microspheres for embolization as an example.

In the present embodiment, a precision pressure pump is used to transport the material and the microsphere generation apparatus is a focusing chip, wherein an inner diameter of the dispersed phase pipe is 80±10 μm, and an inner diameter of the continuous phase pipe is 100±20 μm. The method specifically includes the following steps:

(1) preparation of dispersed phase material: 0.6 g potassium sulfate and 0.1 g lithium phenyl-2,4,6-trimethylbenzoylphosphinate are weighed and 40 g water is added, which are stirred and dissolved magnetically; 6 g sodium allyl sulfonate is slowly dripped and stirred uniformly, and 10 g derivatives of polyvinyl alcohol are added, which are stirred uniformly, so as to obtain the dispersed phase material for future use.

(2) preparation of continuous phase material: 10 g surfactant of cellulose acetate is added to 1000 mL ethyl acetate solution, and then 10 mL triethanolamine is added, which is stirred uniformly, so as to obtain the continuous phase material for future use.

(3) assembly of apparatuses: the prepared dispersed phase material and continuous phase material are added to a liquid storage bottle, and apparatuses such as a pressure control module, a gas source, a computer control panel and pipelines are connected with each other; then the apparatuses are initiated. 50 chips are arranged in parallel in sequence, with pipelines connected to the pipelines of the discharge outlet through adapters respectively, and the outlet pipelines of the chips are communicated with the curing apparatus, wherein the curing apparatus combines two curing methods of the light pre-curing method performed firstly and the thermal curing method performed secondly and is connected to apparatuses such as a UV light and a constant temperature heating and recycling apparatus.

(4) preparation of microspheres with a homogeneous particle size: a pressure switch of the dispersed phase is initiated, the dispersed phase material is transported to the chip pipeline while initiating a pressure switch of the continuous phase, and then the continuous phase material is quickly transported to the pipeline of the micro-reactor; by regulating the relationship between the pressure and the flow rate, the feed flow rate of the dispersed phase material is controlled at 5±1 μL/min, and the feed flow rate of the continuous phase material is controlled at 300±100 μL/min; at a focusing intersection of the chip, the dispersed phase material is shorn into small liquid beads by the oil continuous phase material to form the water-in-oil structure, and then further transported to the curing apparatus; when the microspheres run in the coils, the UV light performs surface pre-curing with a light curing time of is, and then the surfaces of the microspheres are cross-linked, which are collected in a flask and stirred for 3 h under 60° C. after 12 h by initiating the thermal curing apparatus. The microspheres with a homogeneous particle size are cooled to room temperature, washed with butyl acetate, ethyl acetate and acetone respectively, vacuum-dried, and then swelled, so as to obtain the polyvinyl alcohol microspheres for embolization with a homogeneous particle size.

(5) analysis of particle size: the particle size of the microspheres is distributed uniformly, the formation process of the microspheres is controlled, and mass and controllable production may be realized. The particle size of the prepared polyvinyl alcohol microspheres for embolization is 80±25 μm, preferably 80±10 μm, which meets the requirement for homogeneous particle size.

Embodiment 14

The present invention provides a preparation method of microspheres for embolization, which will be described specifically with the polyvinyl alcohol microspheres for embolization as an example.

In the present embodiment, a precision injection pump and a precision constant current pump are used to transport the material and the microsphere generation apparatus is a co-axial micro tube, wherein an inner diameter of the dispersed phase pipe is 1500±500 μm, and an inner diameter of the continuous phase pipe is 500±200 μm. The method specifically includes the following steps:

(1) preparation of dispersed phase material: 0.4 g ammonium persulfate is weighed and 60 g water is added, which are stirred and dissolved magnetically; 8 g 2-acrylamido-2-methyl-1-propanesulfonic acid is slowly dripped and stirred uniformly, and 10 g derivatives of polyvinyl alcohol are added, which are stirred uniformly, so as to obtain the dispersed phase material for future use.

(2) preparation of continuous phase material: 10 g surfactant of fatty acid sorbate is added to 1000 mL butyl acetate solution, and then 8 mL tetramethylethylenediamine is added, which is stirred uniformly, so as to obtain the continuous phase material for future use.

(3) assembly of apparatuses: the injection pump is opened to automatically sucked the prepared dispersed phase into the injection pump; a feed pipeline of the precision constant current pump is inserted into the prepared continuous phase material, and the two feed outlet pipelines are connected to the chip pipeline correspondingly; 4 chips are arranged in parallel in sequence, with pipelines connected to the pipelines of the discharge outlet through adapters respectively, and the outlet pipelines of the chip are communicated with the curing apparatus, wherein the curing apparatus adopts the thermal curing method and is connected to a constant temperature heating and recycling apparatus.

(4) preparation of microspheres with a homogeneous particle size: parameters of the injection pump are set, and the feed flow rate is set at 10-500 μL/min; parameters of the constant current pump are set, and the feed flow rate is set at 1000-50000 μL/min. The injection pump is opened to push the dispersed phase material to the chip pipeline while opening the precision constant current pump, and the continuous phase material is quickly transported to the chip pipeline; at a focusing intersection of the chip, the dispersed phase material is shorn into small liquid beads by the oil continuous phase material to form the water-in-oil structure, and then further transported to the curing apparatus to be stirred and cured for 10 h under 60° C. The microspheres with a homogeneous particle size are cooled to room temperature, washed with butyl acetate, ethyl acetate and acetone respectively, vacuum-dried, and then swelled, so as to obtain the polyvinyl alcohol microspheres for embolization with a homogeneous particle size.

(5) Analysis of particle size: the particle size of the prepared polyvinyl alcohol microspheres for embolization is 500-1400 μm, which meets the requirement for homogeneous particle size.

Those skilled in the art should understand that the present invention may be realized in many other concrete forms without departing from its own spirit or scope. Although the embodiment of the present invention has been described, it should be understood that the present invention should not be limited to these embodiments, and those skilled in the art may make changes and modifications within the spirit and scope of the present invention as defined in the attached claims.

What is claimed is:

1. A preparation method of microspheres for embolization, performed by a preparation device, wherein the method comprises: feeding an oil phase material into a micro-reactor through a continuous phase feed system and feeding a water phase material into the micro reactor respectively in the feed system; cutting the water phase material into small liquid beads under the action of a shear force of the oil phase material in a micro-reactor channel to form a water-in-oil structure, and finally conducting curing through the curing apparatus to obtain polyvinyl alcohol microspheres for embolization with homogeneous particle sizes:
   wherein the water phase material is polyvinyl alcohol and derivatives thereof, water, a crosslinking agent and a water phase material initiator; the oil phase material is an oil phase material initiator, a surfactant and an ester solvent.

2. The preparation method of microspheres for embolization according to claim 1, wherein the mass ratio of the polyvinyl alcohol and derivatives thereof to the water to the crosslinking agent to the water phase material initiator is 10:(1-100):(1-10):(0.01-0.6); both the oil phase material initiators and the surfactants account for 0.1%-5% of the ester solvents by mass.

3. The preparation method of microspheres for embolization according to claim 1, wherein the polyvinyl alcohol and derivatives thereof, with polyvinyl alcohol as a substrate and amino/hydroxyl derivatives of pyridine/sulfonate that may be cross-linked after acylation as a modifier, are modified to prepare cross-linkable small molecular polymers containing structures of acrylic acid and derivatives thereof.

4. The preparation method of microspheres for embolization according to claim 1, wherein the water phase initiator is a peroxygenic initiator and/or a photoinitiator, and the photoinitiator specifically comprises benzils or acylphosphine oxides.

5. The preparation method of microspheres for embolization according to claim 1, wherein the polyvinyl alcohol microspheres for embolization generated by controlling the micro-reactors with different diameters have an adjustable size within a range of 20-1400 μm, and have a homogeneity of particle sizes of less than 10%.

6. The preparation method of microspheres for embolization according to claim 1, wherein the curing apparatus is an ultraviolet curing apparatus or a thermal curing apparatus;
the thermal curing apparatus adopts a sandwiched reaction flask apparatus to preserve heat by a circulating temperature control apparatus, with a curing temperature of 40-80° C. and a curing time of 1-6 h;
the ultraviolet curing apparatus adopts a coil apparatus to flow the prepared microspheres in a pipeline continuously and use a high-intensity ultraviolet lamp for real-time light curing, with an irradiation wavelength of 200-500 nm and an irradiation time of 2-1000 s.

7. The preparation method of microspheres for embolization according to claim 1, wherein a diameter size of the polyvinyl alcohol microspheres for embolization is controlled by controlling flow rates of the dispersed phase and the continuous phase through the feed system with combination of inner diameters of the corresponding dispersed phase inlet and continuous phase inlet in the micro-reactor.

8. The preparation method of microspheres for embolization according to claim 7, wherein when an inner diameter of a dispersed phase tube is 20±10 μm and an inner diameter of a continuous phase tube is 20±10 μm, a feeding flow rate of the dispersed phase material is controlled at 0.1-2 μL/min, a feed flow rate of the continuous phase material is controlled at 400±200 μL/min and the particle size of the polyvinyl alcohol microspheres for embolization prepared is 20±10 μm;
when the inner diameter of the dispersed phase tube is 60±10 μm and the inner diameter of the continuous phase tube is 90±50 μm, the feeding flow rate of the dispersed phase material is controlled at 2±1 μL/min, the feed flow rate of the continuous phase material is controlled at 200±100 μL/min and the particle size of the polyvinyl alcohol microspheres for embolization prepared is 40±20 μm;
when the inner diameter of the dispersed phase tube is 100±20 μm and the inner diameter of the continuous phase tube is 300±150 μm, the feeding flow rate of the dispersed phase material is controlled at 5±2 μL/min, the feed flow rate of the continuous phase material is controlled at 800±300 μL/min and the particle size of the polyvinyl alcohol microspheres for embolization prepared is 100±25 μm;
when the inner diameter of the dispersed phase tube is 100±20 μm and the inner diameter of the continuous phase tube is 300±150 μm, the feeding flow rate of the dispersed phase material is controlled at 5±2 μL/min, the feed flow rate of the continuous phase material is controlled at 500±200 μL/min and the particle size of the polyvinyl alcohol microspheres for embolization prepared is 250±50 μm;
when the inner diameter of the dispersed phase tube is 250±130 μm and the inner diameter of the continuous phase tube is 500±200 μm, the feeding flow rate of the dispersed phase material is controlled at 20±5 μL/min, the feed flow rate of the continuous phase material is controlled at 2000±500 μL/min and the particle size of the polyvinyl alcohol microspheres for embolization prepared is 500±50 μm;
when the inner diameter of the dispersed phase tube is 800±300 μm and the inner diameter of the continuous phase tube is 1000±500 μm, the feeding flow rate of the dispersed phase material is controlled at 50±20 μL/min, the feed flow rate of the continuous phase material is controlled at 800±200 μL/min and the particle size of the polyvinyl alcohol microspheres for embolization prepared is 800=80 μm;
when the inner diameter of the dispersed phase tube is 800±400 μm and the inner diameter of the continuous phase tube is 2000±1000 μm, the feeding flow rate of the dispersed phase material is controlled at 50±20 μL/min, the feed flow rate of the continuous phase material is controlled at 5000±2500 μL/min and the particle size of the polyvinyl alcohol microspheres for embolization prepared is 1200±100 μm;
when the inner diameter of the dispersed phase tube is 100=20 μm and the inner diameter of the continuous phase tube is 100±50 μm, the feeding flow rate of the dispersed phase material is controlled at 5±2 μL/min, the feed flow rate of the continuous phase material is controlled at 500±300 μL/min and the particle size of the polyvinyl alcohol microspheres for embolization prepared is 100±25 μm;
when the inner diameter of the dispersed phase tube is 80±10 μm and the inner diameter of the continuous phase tube is 100±20 μm, the feeding flow rate of the dispersed phase material is controlled at 5=1 μL/min, the feed flow rate of the continuous phase material is controlled at 300±100 μL/min and the particle size of the polyvinyl alcohol microspheres for embolization prepared is 80±25 μm;
when the inner diameter of the dispersed phase tube is 1500±500 μm and the inner diameter of the continuous phase tube is 500±200 μm, the feeding flow rate of the dispersed phase material is controlled at 10-500 μL/min, the feed flow rate of the continuous phase material is controlled at 1000-50000 μL/min and the particle size of the polyvinyl alcohol microspheres for embolization prepared is 500-1400 μm.

* * * * *